(12) United States Patent
Wise

(10) Patent No.: US 6,311,451 B1
(45) Date of Patent: *Nov. 6, 2001

(54) AUTOMOBILE DOOR PROTECTOR

(76) Inventor: Kevin Wayne Wise, 2508 Beechmont Ave. #43, Cincinnati, OH (US) 45230

( * ) Notice: Subject to any disclaimer, the term of this patent is extended or adjusted under 35 U.S.C. 154(b) by 0 days.

This patent is subject to a terminal disclaimer.

(21) Appl. No.: 09/352,536

(22) Filed: Jul. 13, 1999

(51) Int. Cl.$^7$ ............................ B60R 19/42; B60R 19/30; B60J 11/00
(52) U.S. Cl. .................. 52/716.5; 52/716.4; 52/DIG. 13; 52/718.01; 293/128
(58) Field of Search ............................ 52/716.5, 716.4, 52/DIG. 13, 718.01, 717.03; 293/128

(56) References Cited

U.S. PATENT DOCUMENTS

| | | | | |
|---|---|---|---|---|
| 1,457,259 | * | 5/1923 | Malluk et al. ........................ | 293/107 |
| 1,911,649 | * | 5/1933 | Schlegel ............................... | 52/716.4 |
| 2,000,466 | * | 5/1935 | Howard ................................. | 428/99 |
| 2,017,377 | * | 10/1935 | Schemmel ........................... | 52/716.4 |
| 3,882,574 | * | 5/1975 | Martinez .............................. | 24/293 |
| 4,014,583 | * | 3/1977 | Forbes ................................. | 293/128 |
| 4,560,596 | * | 12/1985 | Coscia .................................. | 428/31 |
| 4,708,380 | * | 11/1987 | Cruz .................................... | 293/128 |
| 4,810,013 | * | 3/1989 | Spears ................................. | 293/128 |
| 4,828,302 | * | 5/1989 | Marasigan ........................... | 293/128 |
| 5,149,166 | * | 9/1992 | Wille et al. ......................... | 293/128 |
| 5,184,857 | * | 2/1993 | Hawkins .............................. | 293/128 |
| 5,320,392 | * | 6/1994 | Hart .................................... | 293/128 |
| 5,956,918 | * | 9/1999 | Wise ................................... | 52/716.5 |
| 5,975,599 | * | 11/1999 | Goldstein ........................... | 293/128 |

* cited by examiner

Primary Examiner—Gregory J. Strimbu

(57) ABSTRACT

An automobile protection device including an elongated cushion inside an elongated fabric sleeve, the ends of which are connected to flexible stops through elastic straps. Each strap having a hook and loop fastener attached to a respective end thereof. Each hook and loop fastener includes a first portion attached to a respective one of the straps and a second portion attached to a respective inside edge of an automobile door. The protection device is attached to the door of the automobile by engaging the respective first and second portions of each of the hook and loop fasteners such that flexible stops are positioned between the inside edges of the door and the body of the automobile and closing the door so that the device cannot be removed from the door.

5 Claims, 3 Drawing Sheets

AUTOMOBILE DOOR PROTECTOR

CROSS-REFERENCE TO RELATED APPLICATION

Ser. No. 08/990,976

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention is a device to protect the doors of an automobile or truck from damage while the vehicle is parked. Automobile and truck doors are susceptible to damage while parked do to objects striking the vehicle. Objects such as shopping carts and carelessly opened doors of a vehicle parked in close proximity can cause dents and scratches to the doors of an automobile or truck. This invention will prevent some of this damage. Prior devices for protecting a vehicles doors from damage have had several disadvantages. One major disadvantage is that some devices are permanently attached to the vehicles doors. Thus if they are damaged, they to would give the vehicle a lesser appearance. Also these devices are both costly and difficult to repair or replace. Other devices that are not permanently attached to a vehicle have had no way of securing them to the vehicle and can be easily stolen. Still other devices have used magnets to connect them to a vehicle, which may cause damage themselves.

BRIEF SUMMARY OF THE INVENTION

The object of the present invention is to provide an easily attachable and detachable cushion for absorbing the impact of an object striking the door of an automobile or truck.

The automobile door protection device is comprised of an elongated cushion to fit horizontally about the outside surface of a vehicles door. The cushion is located inside an elongated fabric sleeve that has a soft, nonabrasive backing attached to it. Attached to each end of the fabric sleeve is an elastic strap with a cylindrical flexible stop attached to the opposing end. The cylindrical flexible stop is used to secure the door protection device to the vehicle. The vehicles door is opened and a stop is positioned between the vehicles door and the vehicles side body panel at each end of the door. Once in position each stop is held in place by a hook and loop fastener. One half of a hook and loop fastener is secured to each elastic strap, the mating half of each hook and loop fastener has been permanently adhered to the inside edge of the vehicles door. So that once the stop is in position and the vehicles door is closed the stop becomes trapped between the vehicles door and side body panel and can not be removed.

DETAILED DESCRIPTION OF THE INVENTION

Figure 1:
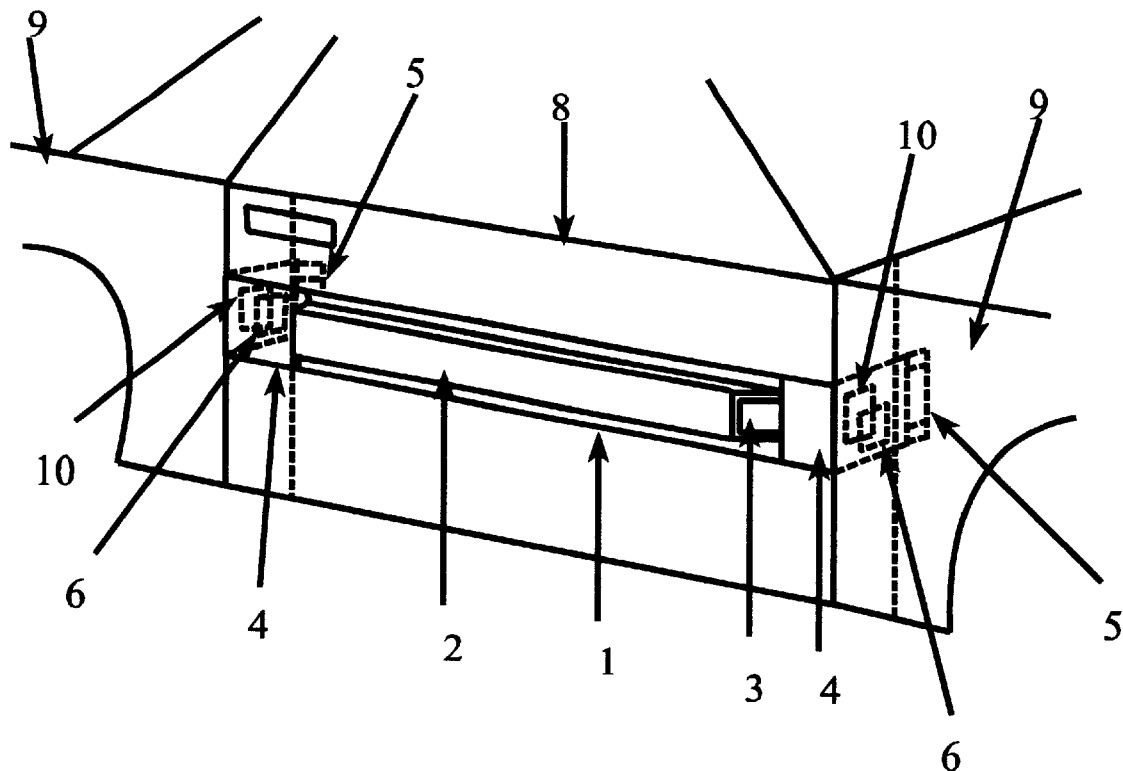
FIG. 1 is a perspective view of the automobile door protection device used to protect the door of an automobile from dents and scratches located in operative engagement with the door of an automobile.
Figure 2:
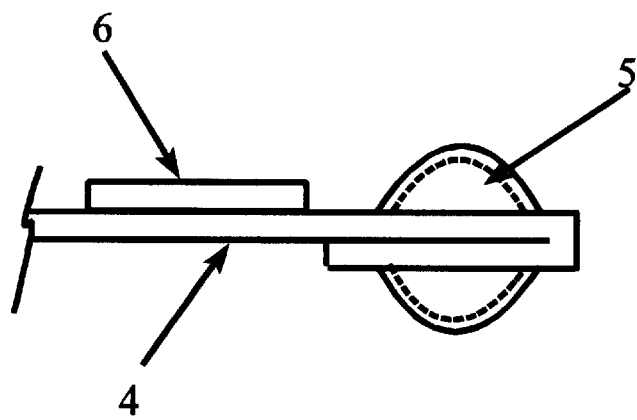
FIG. 2 is an enlarged view of the elastic strap, hook and loop fastener, and the flexible stop.
Figure 3:
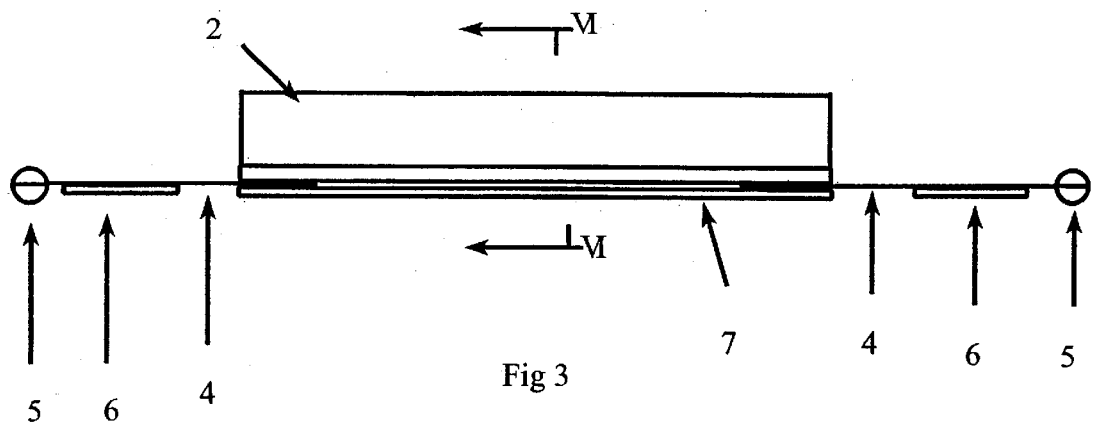
FIG. 3 is a side view of the automobile door protection device of FIG. 1.
Figure 4:
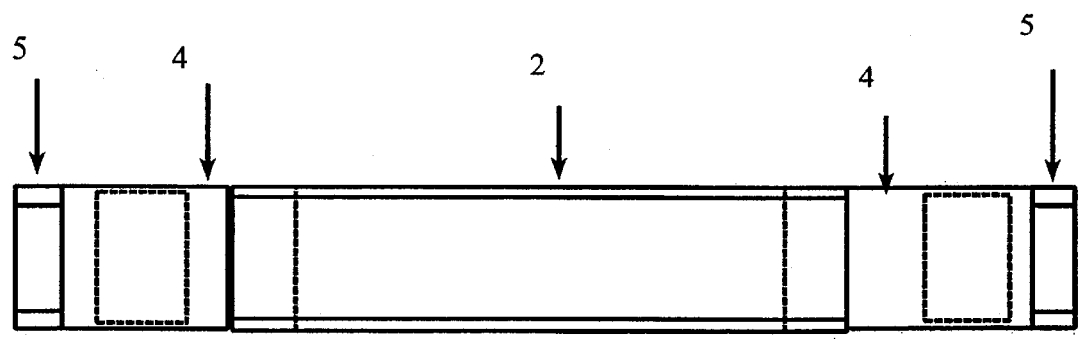
FIG. 4 is a plan view of the automobile door protection device of FIG. 1.
Figure 5:
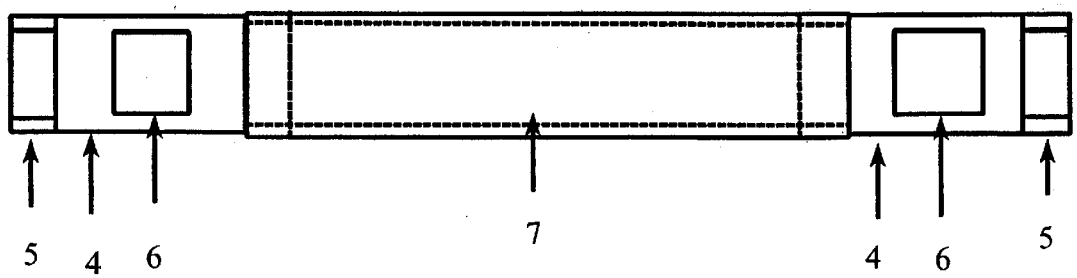
FIG. 5 is a bottom view of the automobile door protection device of FIG. 1.
Figure 6:
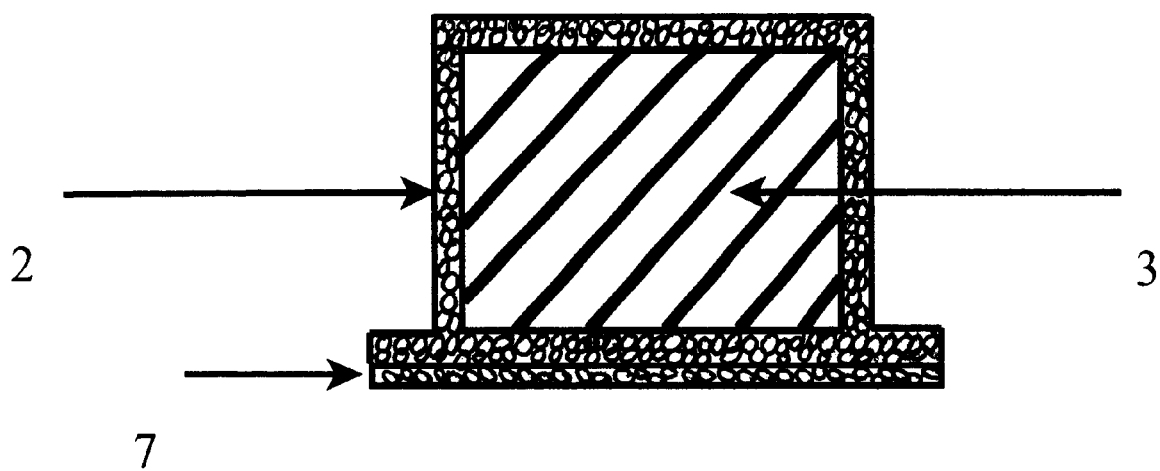
FIG. 6 is a sectional view of the fabric sleeve, cushion, and nonabrasive backing assembly, taken along the line VI—VI of FIG. 3.

Referring to FIG. 1, an automobile door protection device indicated generally at 1 is used to protect an automobile door 8 from being dented and scratched. The device 1 consists of an elongated cushion 3 inside an elongated fabric sleeve 2 that has an elastic strap 4 attached to each end. At the end of each elastic strap 4 is a flexible stop 5. These flexible stops 5 are made of a cylindrical pliable material that can conform to a shape and size necessary to fit in the space between an automobile door 8 and automobile side body panel 9 when the automobile door 8 is in the closed position. Once the flexible stop 5 is placed into position and the automobile door 8 is closed the flexible stop 5 becomes trapped between the automobile door 8 and the automobile side body panel 9 and can not be removed until the automobile door 8 is opened again. Also attached to each elastic strap 4 near flexible stop 5 is a hook and loop fastener 6. These hook and loop fasteners 6 work with mating hook and loop fasteners 10 that have been permanently attached to each end of automobile door 8 or side body panel 9, in the space where automobile door 8 and automobile side body panel 9 meet. The device 1 works by opening automobile door 8 which enlarges the space where the automobile door 8 and the automobile side body panel 9 meet. The end of one of the elastic straps 4 that has the flexible stop 5 and hook and loop fastener 6 is placed in the now enlarged space, where hook and loop fastener 6 mates with hook and loop fastener 10 to hold flexible stop 5 in position. The elongated fabric sleeve 2 which houses the elongated cushion 3 has a soft nonabrasive fabric backing 7 which is placed flat against the outside surface of the automobile door 8 and the second elastic strap 4 is pulled to the opposite end of automobile door 8 so that flexible stop 5 can be placed into position and held there by mating the second hook and loop fastener 6 that is attached to the second elastic strap 4 with the second hook and loop fastener 10 that is attached to automobile door 8. Once elongated fabric sleeve 2 and flexible stops 5 have been placed into position and held there by mating hook and loop fasteners 6 with hook and loop fasteners 10 automobile door 8 is closed the device 1 can not be removed until automobile door 8 is opened again.

While there has been shown and described a preferred embodiment of the automobile door protection device of this invention, it is understood that changes in structure, materials, sizes, and shapes can be made by those skilled in the art without departing from the invention. The invention is defined in the following claims.

I claim:

1. A removable attachable protective device adapted for temporary installation to an outside surface of a door of a automobile to protect said door from being dented and scratched comprising:

an elongated cushion adapted to fit about the outside surface of said door; an elongated fabric sleeve holding said elongated cushion, and first and second elongated straps secured to said elongated sleeve, each strap having a generally cylindrical, flexible stop made of pliable material secured to an end of said strap; each flexible stop adapted to be placed between said door and a side body panel of the automobile to secure said device to said door.

2. The protective device of claim 1, wherein said first and second elongated straps are elastic, and each strap is secured to a respective end of said elongated sleeve.

3. The protective device of claim 1, further comprising hook and loop fasteners secured to the first and second elongated straps.

4. The protective device of claim 3, wherein each said hook and loop fastener includes a first portion secured to a respective one of the first and second elongated straps, and a second portion adapted to be permanently adhered to an inside edge of said door to hold a respective one of said flexible stops in place between said door and said side body panel.

5. The protective device of claim 1, further comprising a soft, nonabrasive, elongated fabric backing secured to said elongated fabric sleeve.

* * * * *